(12) United States Patent
Porret

(10) Patent No.: US 11,591,663 B2
(45) Date of Patent: Feb. 28, 2023

(54) PARAMAGNETIC HARD STAINLESS STEEL AND MANUFACTURING PROCESS THEREOF

(71) Applicant: The Swatch Group Research and Development Ltd, Marin (CH)

(72) Inventor: Joel Porret, Marin-Epagnier (CH)

(73) Assignee: The Swatch Group Research and Development Ltd, Marin (CH)

( * ) Notice: Subject to any disclaimer, the term of this patent is extended or adjusted under 35 U.S.C. 154(b) by 178 days.

(21) Appl. No.: 16/983,227

(22) Filed: Aug. 3, 2020

(65) Prior Publication Data

US 2021/0180145 A1 Jun. 17, 2021

(30) Foreign Application Priority Data

Dec. 13, 2019 (EP) .................................. 19215959

(51) Int. Cl.
*C21D 8/00* (2006.01)
*B33Y 70/00* (2020.01)
(Continued)

(52) U.S. Cl.
CPC .............. *C21D 8/005* (2013.01); *B33Y 70/00* (2014.12); *C21D 6/004* (2013.01); *C22C 38/40* (2013.01);
(Continued)

(58) Field of Classification Search
CPC .. C21D 8/005; C21D 6/004; C21D 2211/001; C21D 2211/005; C21D 2211/004; C21D 1/18; C21D 6/005; C21D 6/008; B33Y 70/00; B33Y 10/00; B33Y 80/00; B33Y 40/20; C22C 38/40; C22C 2202/02; C22C 33/0257; C22C 33/0285; C22C 38/04; C22C 38/001; C22C 38/02; C22C 38/06;
(Continued)

(56) References Cited

U.S. PATENT DOCUMENTS

2007/0242569 A1* 10/2007 Inoue ...................... G02F 1/167
368/205

FOREIGN PATENT DOCUMENTS

CN 1239153 A 12/1999
CN 101580917 A 11/2009
(Continued)

OTHER PUBLICATIONS

Tamura, et al., "The Aging Behavior of an Fe—Cr—Ni Duplex Alloy of Ferrite and Austenite," Nippon Kinzoku Gakkaishi—Journal of the Japan Institute of Metals, vol. 40, No. 4, Apr. 30, 1976, pp. 353-360. (Year: 1976).*

(Continued)

*Primary Examiner* — John A Hevey
(74) *Attorney, Agent, or Firm* — Oblon, McClelland, Maier & Neustadt, L.L.P.

(57) ABSTRACT

A paramagnetic stainless steel with a chemical composition including by weight: 26≤Cr≤40%, 5≤Ni≤20%, 0≤Mn≤5%, 0≤Al≤5%, 0≤Mo≤3%, 0≤Cu≤2%, 0≤Si≤5%, 0≤Ti≤1%, 0≤Nb≤1%, 0≤C≤0.1%, 0≤N≤0.1%, 0≤S≤0.5%, 0≤P≤0.1%, the remainder consisting of iron and any impurities each having a content less than or equal to 0.5%, the steel having a hardness HV10 between 500 and 900. It also relates to a part particularly a horological component made of this steel and to the process for manufacturing the part.

16 Claims, 2 Drawing Sheets

(51) Int. Cl.

| | | |
|---|---|---|
| *C21D 6/00* | (2006.01) | |
| *C22C 38/40* | (2006.01) | |
| *G04B 13/02* | (2006.01) | |
| *G04B 19/12* | (2006.01) | |
| *G04B 37/22* | (2006.01) | |
| *H01F 1/147* | (2006.01) | |
| *B33Y 10/00* | (2015.01) | |
| *B33Y 80/00* | (2015.01) | |
| *G04B 17/06* | (2006.01) | |
| *G04B 19/04* | (2006.01) | |

(52) U.S. Cl.
CPC ............ *G04B 13/02* (2013.01); *G04B 17/063* (2013.01); *G04B 19/042* (2013.01); *G04B 19/12* (2013.01); *G04B 37/22* (2013.01); *H01F 1/147* (2013.01); *B33Y 10/00* (2014.12); *B33Y 80/00* (2014.12); *C21D 2211/001* (2013.01); *C21D 2211/005* (2013.01); *C22C 2202/02* (2013.01)

(58) Field of Classification Search
CPC ......... C22C 38/42; C22C 38/44; C22C 38/48; C22C 38/50; C22C 38/58; C22C 38/60; G04B 13/02; G04B 17/063; G04B 19/042; G04B 19/12; G04B 37/22; G04B 29/027; G04B 43/007; H01F 1/147; B22F 5/00; B22F 10/64; B22F 2003/248; B22F 3/225; B22F 2998/10; Y02P 10/25

See application file for complete search history.

(56) References Cited

FOREIGN PATENT DOCUMENTS

| CN | 102471846 A | 5/2012 |
|---|---|---|
| CN | 106987785 A | 7/2017 |
| JP | 53-41265 A | 4/1978 |
| JP | 54-33216 A | 3/1979 |
| JP | 04-116152 A | 4/1992 |

OTHER PUBLICATIONS

Combined Chinese Office Action and Search Report dated Jan. 18, 2022 in corresponding Chinese Patent Application No. 202011446883.0 (with English Translation of Category of Cited Documents), 18 pages.

European Search Report dated Mar. 11, 2020 in European Application 19215959.8 filed Dec. 13, 2019 (with English Translation of Categories of Cited Documents), 3 pages.

Imao Tamura et al., "The Aging Behavior of an Fe—Cr—Ni Duplex Alloy of Ferrite and Austenite", Nippon Kinzoku Gakkaishi—Journal of the Japan Institute of Metals., vol. 40, No. 4, Apr. 30, 1976, pp. 353-360.

* cited by examiner

PARAMAGNETIC HARD STAINLESS STEEL AND MANUFACTURING PROCESS THEREOF

CROSS-REFERENCE TO RELATED APPLICATION

This application claims priority to European Patent Application No. 19215959.8 filed on Dec. 13, 2019, the entire disclosure of which is hereby incorporated herein by reference.

FIELD OF THE INVENTION

The invention relates to a paramagnetic stainless steel having a hardness between 500 and 900 HV and the part particularly the horological component made of this steel. It also relates to the process for manufacturing this stainless steel part.

BACKGROUND OF THE INVENTION

Hard and non-ferromagnetic metal alloys find applications in numerous fields, essentially for components subject to high mechanical and/or tribological stress and required to remain insensitive to magnetic fields. This is particularly the case for numerous horological components, such as for example wheels, pinions, shafts or indeed springs at the level of the movement. For external parts, it is also of interest to obtain high hardnesses, for example for the middle, the bezel, the back or indeed the crown. Indeed, a high hardness generally makes it possible to obtain a very good polishability for a quality aesthetic appearance, as well as a superior resistance to scratching and to wear, and therefore a good durability of these components exposed to the external environment.

In metallurgy, various mechanisms are used to harden alloys, according to the chemical compositions thereof and the thermomechanical histories thereof. Thus, solid solution hardening, structural hardening, cold-working, martensitic transformation in steels, spinodal decomposition, or indeed hardening by grain size reduction (Hall Petch) are known. In the most remarkable alloys, several of these hardening mechanisms are used simultaneously. However, non-ferromagnetic alloys which have hardnesses greater than 500 HV are rare. Furthermore, to attain such a level of hardness, crystalline non-ferromagnetic alloys generally require a high degree of cold-working, before an optional heat treatment aimed at obtaining the maximum hardness by second phase precipitation. This is the case for example of austenitic stainless steels, only suitable for hardening by cold-working, or indeed some austenitic superalloys, suitable for hardening by cold-working followed by a precipitation heat treatment. In practice, the manufacture of components from these alloys in the cold-worked state is difficult. Firstly, in the case of forming by forging, obtaining the correct degree of cold-working to obtain the required hardness is not simple, especially for parts with complex geometry. As an alternative, machining can be performed in semi-finished products having a defined and homogeneous cold-working degree, but it is not always easy to obtain the correct material formats with the required degree of cold-working. Furthermore, any machining operations are very difficult and costly, as the alloy is already in the hardened state, at least partially. Finally, if the process used does not involve plastic deformation, such as certain powder metallurgy or additive manufacturing processes, it is simply not possible to harden these alloys. As an alternative, it would be possible to manufacture alloys having intrinsically a hardness greater than 500 HV, such as certain high-entropy alloys or certain intermetallic alloys for example, but they would be once again very difficult to machine and practically impossible to deform, due to the very high hardnesses thereof and the very low ductilities thereof. The benefit of finding an alloy suitable for hardening by heat treatment without requiring prior cold-working, while being non-ferromagnetic in the hardened state, is thus understood. The forming would thus be performed in the soft and ductile state, and a hardening heat treatment would be performed once the part is completed. This explains in particular the huge success of carbon steels and martensitic stainless steels, but the latter are unfortunately ferromagnetic.

To obtain hardnesses greater than 500 HV in non-ferromagnetic alloys, other solutions are now widely used. Various surface hardening processes are particularly applied on austenitic stainless steels or titanium alloys for example, after forming the parts. However, the thickness of the hardened layer is generally very small, of the order of a few tens of micrometres, and the surface appearance is generally modified by the treatment. For horological components, it is therefore necessary to rework the parts after hardening to obtain a clean and generally polished surface. However, these finishing operations remove all or part of the hardened layer and this solution is therefore little used in practice, especially as surface hardening treatments are generally costly.

Once again, the need to find a non-ferromagnetic alloy suitable for hardening by heat treatment at 500-900 HV, the hardness range wherein carbon steels in the hardened and tempered state, martensitic stainless steels, certain substantially hardened stainless steels or some cold-worked and heat-treated austenitic super alloys are generally found, is understood.

SUMMARY OF THE INVENTION

The present invention relates to an optimised stainless steel composition for obtaining a paramagnetic behaviour and a hardness between 500 and 900 HV10 by means of heat treatment without no prior cold-working required during the manufacturing process.

The composition according to the invention is the following by weight:
  $26 \leq Cr \leq 40\%$,
  $5 \leq Ni \leq 20\%$,
  $0 \leq Mn \leq 5\%$,
  $0 \leq Al \leq 5\%$,
  $0 \leq Mo \leq 3\%$,
  $0 \leq Cu \leq 2\%$,
  $0 \leq Si \leq 5\%$,
  $0 \leq Ti \leq 1\%$,
  $0 \leq Nb \leq 1\%$
  $0 \leq C \leq 0.1\%$,
  $0 \leq N \leq 0.1\%$,
  $0 \leq S \leq 0.5\%$,
  $0 \leq P \leq 0.1\%$,
the remainder consisting of iron and any impurities each having a content less than or equal to 0.5%.

According to the invention, the process for manufacturing a stainless steel part consists of carrying out a first heat or thermomechanical treatment on a base material of the composition cited above in the ferritic or ferritic-austenitic range and subsequently hardening the material in order to retain the ferritic or ferritic-austenitic structure at ambient temperature. This ferritic or ferritic-austenitic microstructure is soft and therefore ductile, which enables easy forming. Then, after optional forming, a hardening treatment is carried out in order to transform the ferrite into an austenitic phase and into an intermetallic sigma phase rich in chromium.

The novelty of the present invention stems in particular from the use of the sigma phase as a source of hardening, since this phase has always been considered as harmful and therefore undesired in stainless steels. Indeed, as the sigma phase is rich in chromium and it is generally formed at the grain boundaries, it reduces corrosion resistance drastically by reducing the chromium concentration of the other phases present in the alloy. Then, it weakens stainless steels very rapidly and substantially, even in very small quantities. Indeed, this phase having a complex tetragonal structure, it is intrinsically very brittle and the presence thereof at the grain boundaries creates a favoured path for crack propagation. It has therefore never been used in stainless steels, despite the two particularly advantageous properties thereof which are the hardness thereof between 900 and 1100 HV10 and the paramagnetic nature thereof.

According to the invention, the composition of the stainless steel and the process are optimised so as to obtain a fine distribution both in the sigma phase and the austenitic phase without favoured formation of the sigma phase at the grain boundaries. This particular microstructure consisting of two non-ferromagnetic phases makes it possible to obtain a very good compromise between hardness and tenacity, a good corrosion resistance, as well as an excellent polishability.

Further features and advantages of the present invention will emerge on reading the following detailed description with reference to the following figures.

DESCRIPTION OF THE INVENTION

Figure 1:
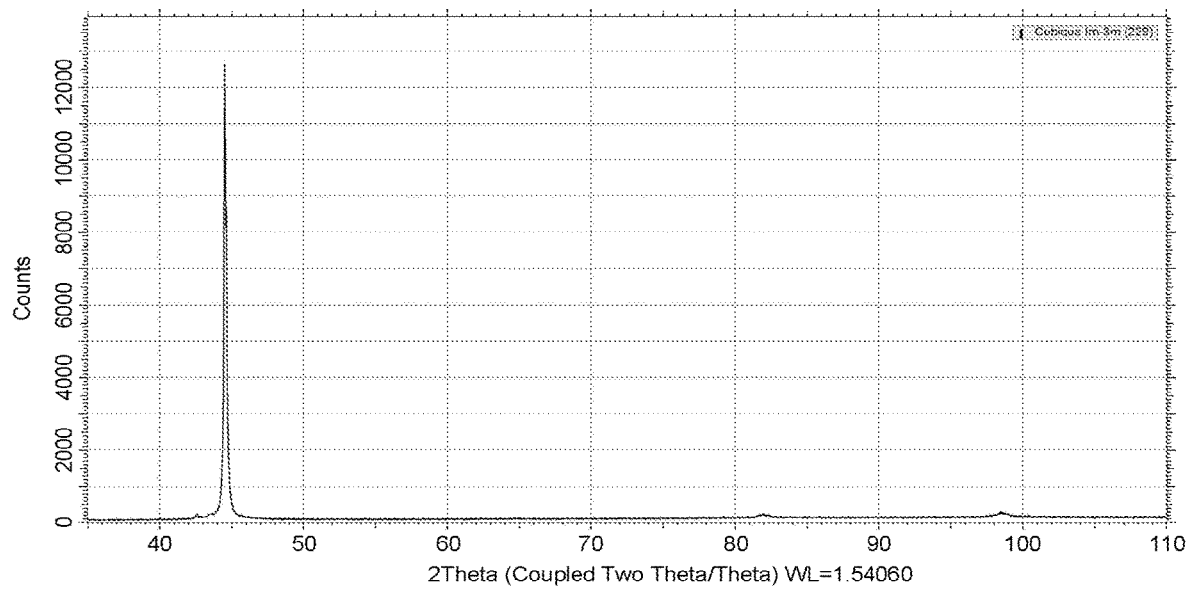
FIGS. 1 and 2 represent the diffractogram of an Fe-35% Cr-9% Ni (% weight) steel according to the invention respectively before and after the hardening treatment.

The invention relates to paramagnetic stainless steels having a hardness between 500 and 900 HV10 as well as the process for manufacturing parts made of these steels. HV10 hardness denotes a Vickers hardness measured as per the standard ISO 6507-1:2018. The invention also relates to a part and more specifically a horological component made with this steel. It may consist of an external part component chosen from the non-exhaustive list comprising a middle, a back, a bezel, a crown, a push-piece, a wristlet link, a wristlet, a tongue buckle, a dial, a hand, and a dial index. It may also consist of a movement component chosen from the non-exhaustive list comprising a toothed wheel, a shaft, a pinion, a spring, a bridge, a plate, a screw, and a balance.

The stainless steels according to the invention have the following composition by weight:
$26 \leq Cr \leq 40\%$,
$5 \leq Ni \leq 20\%$,
$0 \leq Mn \leq 5\%$,
$0 \leq Al \leq 5\%$,
$0 \leq Mo \leq 3\%$,
$0 \leq Cu \leq 2\%$,
$0 \leq Si \leq 5\%$,
$0 \leq Ti \leq 1\%$,
$0 \leq Nb \leq 1\%$
$0 \leq C \leq 0.1\%$,
$0 \leq N \leq 0.1\%$,
$0 \leq S \leq 0.5\%$,
$0 \leq P \leq 0.1\%$,
the remainder consisting of iron and any impurities each having a content less than or equal to 0.5%.

Preferably, they have the following composition by weight:
$28 \leq Cr \leq 38\%$,
$5 \leq Ni \leq 15\%$,
$0 \leq Mn \leq 3\%$,
$0 \leq Al \leq 3\%$,
$0 \leq Mo \leq 3\%$,
$0 \leq Cu \leq 2\%$,
$0 \leq Si \leq 5\%$,
$0 \leq Ti \leq 1\%$,
$0 \leq Nb \leq 1\%$
$0 \leq C \leq 0.05\%$,
$0 \leq N \leq 0.05\%$,
$0 \leq S \leq 0.5\%$,
$0 \leq P \leq 0.1\%$,
with again the remainder consisting of iron and any impurities each having a content less than or equal to 0.5%.

More preferentially, they have the following composition by weight:
$30 \leq Cr \leq 36\%$,
$5 \leq Ni \leq 10\%$,
$0 \leq Mn \leq 3\%$,
$0 \leq Al \leq 1\%$,
$0 \leq Mo \leq 1\%$,
$0 \leq Cu \leq 3\%$,
$0 \leq Si \leq 3\%$,
$0 \leq Ti \leq 1\%$,
$0 \leq Nb \leq 1\%$
$0 \leq C \leq 0.05\%$,
$0 \leq N \leq 0.05\%$,
$0 \leq S \leq 0.5\%$,
$0 \leq P \leq 0.1\%$,
with once again the same remainder of iron and any impurities.

According to the invention, the process for manufacturing a stainless steel part includes a step a) of providing or producing a blank having a composition falling within the ranges cited above. This blank has a mostly ferritic or, preferably, 100% ferritic structure. The blank is obtained from a base material subjected to a heat or thermomechanical treatment at a temperature included in the 950° C.-1450° C. range following by a hardening. The base material can be in the form of a powder or a consolidated material. It can be produced by casting, by pressing, by metal injection moulding (MIM), by additive manufacturing, and more broadly by powder metallurgy. It can be envisaged to produce the base material and carry out the heat treatment in a single step, for example by means of a selective laser melting (SLM) technique. These different techniques make it possible to produce a blank with a base material having dimensions substantially equal to those of the part to be produced, in which case a subsequent forming step is not required.

The composition of the base material is optimised to obtain a mostly or completely ferritic structure when holding at the temperature between 950° C. and 1450° C. for a time between 1 minute and 24 hours. The temperature is chosen to obtain a mass fraction of austenite less than or equal to 40% and a mass fraction of ferrite greater than or equal to 60%. The presence of austenite makes it possible to obtain a minimum hardness and a maximum ductility to enable easy forming, for example by forging, by blanking or by machining.

The heat or thermomechanical treatment in the 950° C.-1450° C. range can be used to carry out homogenisation, recrystallisation or stress relaxation treatments on base materials obtained by casting or to carry out sintering on base materials in powder form. The treatment in the ferritic or ferritic-austenitic range can be carried out in a single cycle or include several heat or thermomechanical treatment cycles. It can also be preceded or followed by other heat or thermomechanical treatments.

After holding in the ferritic or ferritic-austenitic range, the blank is subjected to a rapid cooling, also referred to as hardening, to a temperature less than 500° C. so as to prevent the formation of new phases during cooling. Thus, the ferritic or ferritic-austenitic structure is kept at ambient temperature. Thanks to the compositions according to the invention, the ferritic structure is sufficiently stable to be kept at ambient temperature after a rapid cooling but sufficiently metastable to be readily and rapidly transformed into sigma phase and into austenite during a subsequent heat treatment at intermediate temperatures between 650° C. and 900° C.

Following step a), the alloy has a low hardness and a high ductility enabling if applicable easy forming, for example by forging, by blanking or by machining.

After step a), the method includes an optional step b) of forming the blank by machining, blanking or by any operation involving a deformation such as forging. This step can be performed in several sequences. This step is not required if the blank from step a) already has the final shape of the part to be manufactured.

Besides the forming, a plastic deformation operation can be used to increase particularly the ferrite transformation rate during the subsequent step of transforming ferrite into austenite and into sigma phase. Furthermore, as the hardening by cold-working is low for ferritic structures and the alloy according to the invention is mostly or completely ferritic before the treatment by hardening, this plastic deformation step does not induce problematic hardening for optional forming by machining or blanking. This plastic deformation in one or more sequences can be carried out at a temperature less than 650° C.

After the optional forming, the process includes a step c) of hardening heat treatment of the blank between 650° C. and 900° C. to obtain the final properties. The duration of the heat treatment between 650° C. and 900° C. is fixed so as to ensure a complete transformation of the ferrite and therefore obtaining of a microstructure formed from a sigma phase and an austenitic phase.

The transformation rate of the ferrite into austenite+sigma phase is dependent particularly on the composition of the alloy and the thermomechanical history thereof as mentioned above. As a general rule, the duration of the treatment is situated between 30 minutes and 24 hours. After the hardening treatment, the steel has a mass fraction of sigma phase between 40% and 80% and a mass fraction of austenite between 20% and 60%, the percentages being dependent on the chemical composition and the heat treatments carried out. The part obtained has a high hardness between 500 and 900 HV10 thanks to the hardening heat treatment. As for all stainless steels, optional non-metallic inclusions can be also be present in small quantities, without affecting the mechanical and magnetic properties. Furthermore, inclusions for enhancing the machinability, such as for example manganese sulphides, can also be present in small quantities in the alloy.

This hardening heat treatment step can be followed by an optional surface finishing step d) such as polishing.

Moreover, in the presence of a blank with an austenite+ferrite structure in step a), the manufacturing process can include an additional step b') before the hardening heat treatment, in the 950° C.-1450° C. temperature range to transform the austenite+ferrite structure into a 100% ferritic structure.

In sum, after the high-temperature (950° C.-1450° C.) heat treatment followed by a hardening, the steels have particularly the following properties:
Hardness between 150 and 400 HV10.
Good ductility with a plastic deformation without cracking greater than 50% in compression at ambient temperature.
Ferromagnetic behaviour, due to the presence of ferrite.
After the hardening heat treatment, the steels according to the invention have particularly the following properties:
Hardness between 500 and 900 HV10.
Paramagnetic behaviour.
Excellent polishability, thanks to the very fine microstructure.
Good resistance to wear.
Good resistance to corrosion.

Concerning the resistance to corrosion, the steel according to the invention is particularly effective thanks to the high chromium concentration. These steels are therefore particularly advantageous for external part components.

Finally, the invention is illustrated using the examples hereinafter.

EXAMPLES

Figure 2:
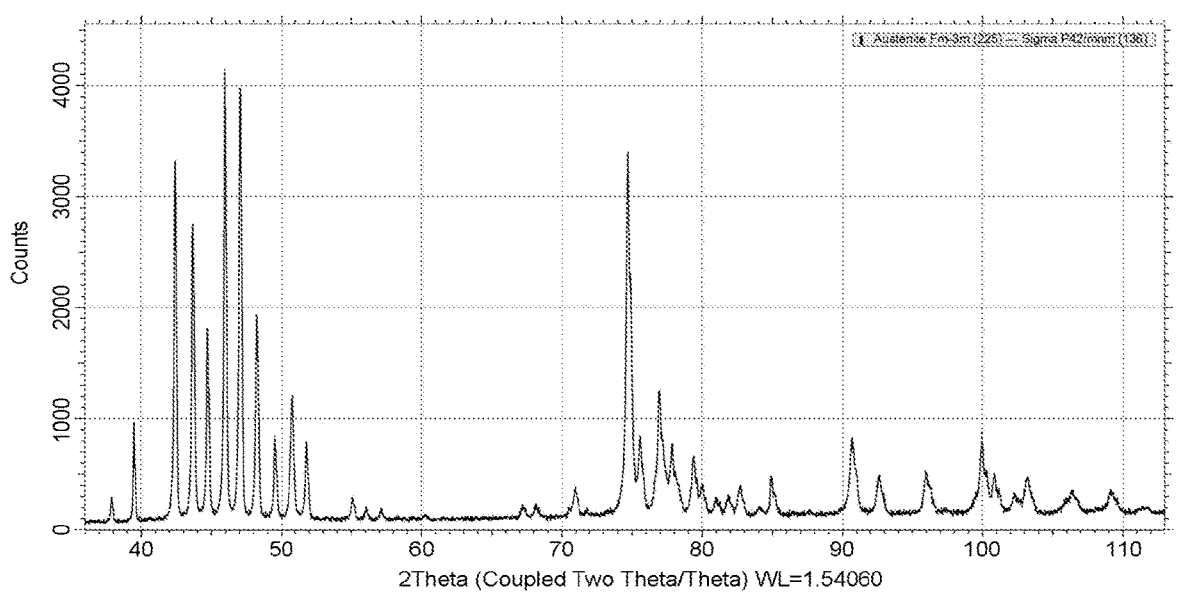

In a first example, the steel named Fe35Cr9Ni contains in mass percentages 56% iron, 35% chromium, and 9% nickel. It was manufactured by arc melting from high-purity elements (>99.9%), deformed at ambient temperature by compression with a reduction in the thickness by a factor of 2 and subjected to a homogenisation heat treatment in the ferritic range at 1300° C. for 2 hours in an argon atmosphere followed by gas hardening (about 200K/min). After this homogenisation heat treatment, the alloy Fe35Cr9Ni has a single-phase ferritic microstructure with a Vickers hardness of 350 HV10. The completely ferritic structure (space group Im3m) is confirmed by the X-ray diffraction (XRD) analysis as represented in FIG. 1. After homogenisation, a hardening heat treatment was carried out at 800° C. for 6 hours. A fine, homogenous, and two-phase microstructure comprising the austenitic phase and the sigma phase is obtained. The X-ray diffraction analysis shown in FIG. 2 confirms the presence of austenite (space group Fm3m) and a tetragonal structure corresponding to the sigma phase (space group P42/mnm).

In this metallurgic state, the alloy Fe35Cr9Ni has a Vickers hardness of 670 HV10. The corrosion resistance thereof was evaluated using a salt spray test as per the ISO 9227 standard. After the test, the alloy shows no sign of corrosion, demonstrating the excellent corrosion resistance thereof in a saline environment. This is all the more remarkable as the presence of sigma phase, even in small proportions, has always induced a substantial reduction of corrosion resistance in stainless steels.

Figure 3:
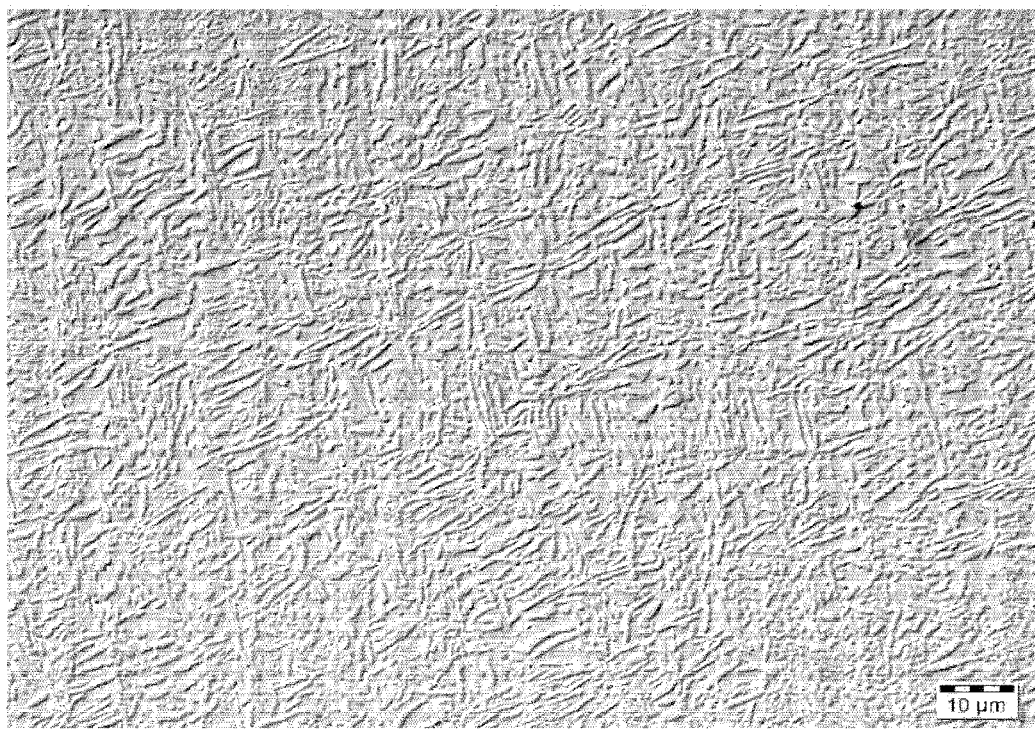
FIG. 3 represents an image obtained by optical microscopy of an Fe-32% Cr-9% Ni (% weight) steel according to the invention.
Figure 4:
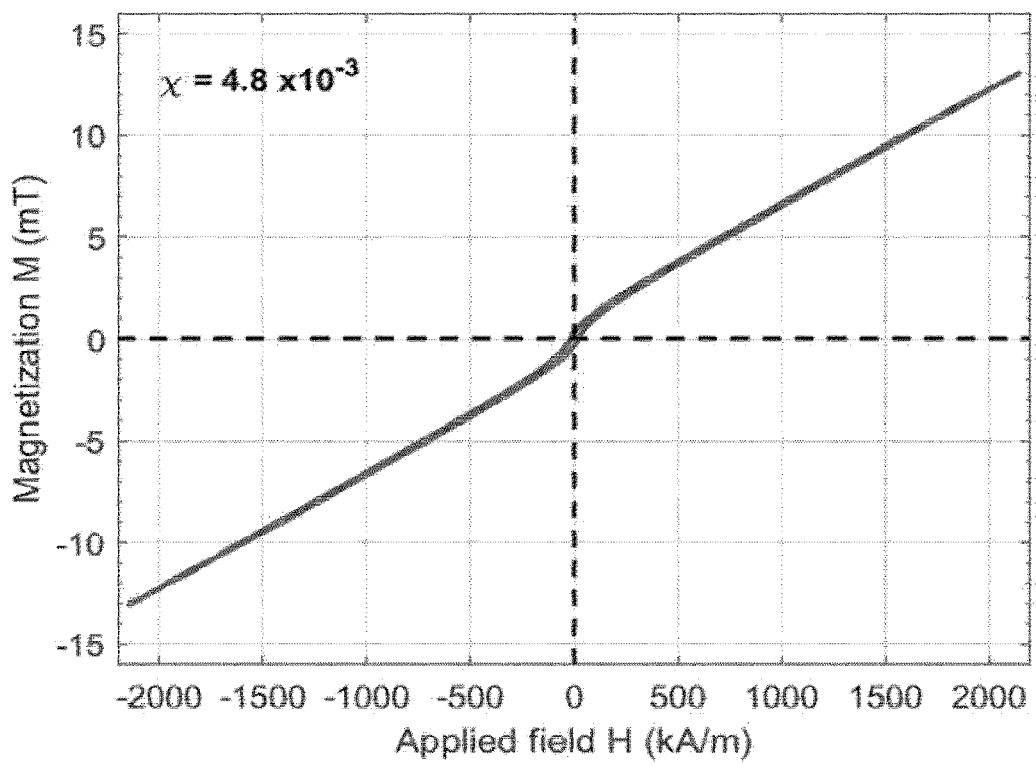
FIG. 4 represents for the same alloy the magnetic hysteresis curve.

In a second example, the steel named Fe32Cr9Ni contains in mass percentages 59% iron, 32% chromium, and 9% nickel. It was also manufactured by arc melting from high-purity elements (>99.9%), subjected to a homogenisation heat treatment at 1300° C. for 2 hours in argon followed by a gas hardening, deformed at ambient temperature by compression with a reduction in the thickness by a factor of 2, subjected to a recrystallisation heat treatment at 1200° C. in air for 1 minute following by a water hardening. After this recrystallisation heat treatment, the alloy Fe32Cr9Ni has a single-phase ferritic microstructure with a Vickers hardness of 220 HV10. Then, it was brought to 700° C. for 6 hours in a vacuum. The microstructure observed in optical microscopy in polarised light is represented in FIG. 3. A fine distribution of the two phases is observed, with in relief the austenitic phase and in matrix the sigma phase. In this metallurgic state, the alloy Fe32Cr9Ni has a Vickers hardness of 635 HV10. Concerning the magnetic properties of this steel, the hysteresis curve was measured at ambient temperature with a vibrating sample magnetometer (magnetisation M according to the field applied H). Despite having a relatively high volume susceptibility, this steel has a signature linear behaviour of paramagnetic behaviour (FIG. 4).

The invention claimed is:

1. A paramagnetic stainless steel with a chemical composition comprising by weight:
   $26 \leq Cr \leq 40\%$,
   $5 \leq Ni \leq 20\%$,
   $0 \leq Mn \leq 5\%$,
   $0 \leq Al \leq 5\%$,
   $0 \leq Mo \leq 3\%$,
   $0 \leq Cu \leq 2\%$,
   $0 \leq Si \leq 5\%$,
   $0 \leq Ti \leq 1\%$,
   $0 \leq Nb \leq 1\%$
   $0 \leq C \leq 0.1\%$,
   $0 \leq N \leq 0.1\%$,
   $0 \leq S \leq 0.5\%$,
   $0 \leq P \leq 0.1\%$,
   the remainder consisting of iron and any impurities each having a content less than or equal to 0.5%,
   wherein the steel has a hardness HV10 in a range of from 500 to 900,
   wherein the steel has a microstructure consisting of a sigma phase with a mass percentage in a range of from 40 to 80% and an austenitic phase within a mass percentage in a range of from 20 to 60%, the austenitic phase originating from transforming an alloy having a structure including 100% ferrite.

2. The steel of claim 1, with a chemical composition comprising by weight:
   $28 \leq Cr \leq 38\%$,
   $5 \leq Ni \leq 15\%$,
   $0 \leq Mn \leq 3\%$,
   $0 \leq Al \leq 3\%$,
   $0 \leq Mo \leq 3\%$,
   $0 \leq Cu \leq 2\%$,
   $0 \leq Si \leq 5\%$,
   $0 \leq Ti \leq 1\%$,
   $0 \leq Nb \leq 1\%$
   $0 \leq C \leq 0.05\%$,
   $0 \leq N \leq 0.05\%$,
   $0 \leq S \leq 0.5\%$,
   $0 \leq P \leq 0.1\%$.

3. The steel of claim 1, with a chemical composition comprising by weight:
   $30 \leq Cr \leq 36\%$,
   $5 \leq Ni \leq 10\%$,
   $0 \leq Mn \leq 3\%$,
   $0 \leq Al \leq 1\%$,
   $0 \leq Mo \leq 1\%$,
   $0 \leq Cu \leq 1\%$,
   $0 \leq Si \leq 3\%$,
   $0 \leq Ti \leq 1\%$,
   $0 \leq Nb \leq 1\%$
   $0 \leq C \leq 0.05\%$,
   $0 \leq N \leq 0.05\%$,
   $0 \leq S \leq 0.05\%$,
   $0 \leq P \leq 0.1\%$.

4. A part, made of the paramagnetic stainless steel claim 1.

5. The part of claim 4, comprising horological component of external parts or of a movement of a timepiece.

6. A watch, comprising:
   a horological component made of the paramagnetic stainless steel of claim 1.

7. A process for manufacturing a part formed from the paramagnetic stainless steel of claim 1, comprising: heat treating or hardening a blank having substantially a shape of the part to be manufactured, to obtain the part, the hardening being carried out at a temperature in a range of from 650 to 900° C. for a time in a range of from 30 minutes to 24 hours, thereby transforming a ferrite of the structure into an austenitic phase and an intermetallic sigma phase, the hardening being followed by cooling to ambient temperature.

8. The process of claim 7, wherein a mostly or completely ferritic structure of the blank prior to the heat treating or hardening has been produced by performing a heat or thermomechanical treatment on a base material at a temperature in a range of from 950 to 1450° C. for a time in a range of from 1 minute to 24 hours,
   wherein the heat or thermomechanical treatment is followed by a hardening to a temperature less than 500° C. to retain the ferritic structure at ambient temperature.

9. The process of claim 8, wherein the base material is in the form of a powder or a consolidated material.

10. The process of claim 8, wherein the base material has been obtained by casting, by pressing, by metal injection molding, by additive manufacturing, or by powder metallurgy.

11. The process of claim 7, further comprising;
    producing the blank by selective laser melting.

12. The process of claim 7, wherein, prior to the heat treating or hardening, the blank has a hardness in a range of from 150 to 400 HV10.

13. The process of claim 7, further comprising, prior to the heat treating or hardening: forming a blank of the paramagnetic stainless steel by one or more plastic deformation sequences at a temperature less than 650° C.

14. The process of claim 7, further comprising, prior to the heat treating or hardening: forming a blank of the paramagnetic stainless steel by forging, blanking, or machining.

15. The process of claim 8, wherein the heat treating or hardening is carried out in several cycles.

16. The process of claim 7, further comprising:
    before the heat treating or hardening, a heat or thermomechanical treating on an initial blank, at least partially comprising austenite, at a temperature in a range of from 950 to 1450° C. for a time in a range of from 1 minute to 24 hours to obtain a completely ferritic structure in the blank,
    wherein the heat or thermomechanical treating is followed by a hardening to a temperature less than 500'C to retain the completely ferritic structure at ambient temperature.

* * * * *